United States Patent
Toskala et al.

(10) Patent No.: US 6,782,269 B2
(45) Date of Patent: Aug. 24, 2004

(54) TWO THRESHOLD UPLINK RATE CONTROL TO ENABLE UPLINK SCHEDULING

(75) Inventors: Antti Toskala, Espoo (FI); Esa Malkamäki, Espoo (FI); Guan Hao, Beijing (CN); Mikko J. Rinne, Helsinki (FI); R. Thomas Derryberry, Plano, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/172,498

(22) Filed: Jun. 17, 2002

(65) Prior Publication Data

US 2003/0232624 A1 Dec. 18, 2003

(51) Int. Cl.[7] .............................. H04B 7/00; H04Q 7/20
(52) U.S. Cl. ........................ 455/509; 455/510; 455/517; 455/452.1; 370/335; 370/442; 370/468
(58) Field of Search .............................. 455/422.1, 507, 455/509, 510, 511, 512, 515, 517, 68, 69, 452.1, 452.2; 370/230, 235, 468, 320, 322, 335, 342

(56) References Cited

U.S. PATENT DOCUMENTS

| | | | |
|---|---|---|---|
| 5,583,869 A | | 12/1996 | Grube et al. ................ 370/347 |
| 5,963,548 A | * | 10/1999 | Virtanen ...................... 370/335 |
| 6,088,335 A | * | 7/2000 | I et al. ........................ 370/252 |
| 6,356,767 B2 | | 3/2002 | Froula ......................... 455/452 |
| 6,374,112 B1 | | 4/2002 | Widegren et al. ........... 455/512 |
| 6,400,954 B1 | | 6/2002 | Khan et al. .................. 455/450 |
| 6,418,148 B1 | | 7/2002 | Kumar et al. ................ 370/468 |
| 6,522,666 B1 | * | 2/2003 | Tzannes et al. ............. 370/471 |
| 6,542,736 B1 | * | 4/2003 | Parkvall et al. ............. 370/465 |
| 6,560,211 B2 | * | 5/2003 | Esteves et al. .............. 370/331 |
| 6,574,211 B2 | * | 6/2003 | Padovani et al. ........... 370/347 |

OTHER PUBLICATIONS

Written Opinion in International Application No. PCT/IB03/01965, dated Apr. 13, 2004, 5 pages.

* cited by examiner

Primary Examiner—Simon Nguyen
(74) Attorney, Agent, or Firm—Brown Raysman Millstein Felder & Steiner

(57) ABSTRACT

A wireless communications network has a plurality of terminals and at least one base station which transmits data to each one of said plurality of terminals on a wireless downlink and receives data from each one of said plurality of terminals on a wireless uplink. One of the terminals sends a rate request to the base station. The rate request requests that the data rate on the wireless uplink for the terminal be changed. In response to the rate request, the base station sends a rate grant to the terminal. The rate grant indicates whether or not the terminal may change the data rate on the wireless uplink.

41 Claims, 2 Drawing Sheets

TWO THRESHOLD UPLINK RATE CONTROL TO ENABLE UPLINK SCHEDULING

BACKGROUND OF THE INVENTION

1. Field of the Invention

The present invention relates generally to the field of wireless communications. More particularly, the present invention relates to uplink enhancements in the air interface between a terminal and a base station in a wireless communications network.

2. Description of the Related Art

The air interface between a terminal and a base station in a wireless communications network relates directly to the achievable level of performance of the network. It is essential to have a low signal-to-interference ratio (SIR) requirement for sufficient link performance with various coding and diversity solutions in the physical layer, since the physical layer defines the fundamental capacity limits of the air interface.

In $3^{rd}$ generation wireless communications systems, such as that specified by Release '99 or subsequent releases of the 3rd Generation Partnership Project joint standardization project (www.3gpp.org), the physical layer is not designed around a single service, such as voice; more flexibility is necessary to enable dynamic scheduling of multimedia services. In Release '99, 3GPP TS 25.211–25.215 describes the physical layer, 3GPP TS 25.331 describes the radio resource control protocol, and 3GPP TS 25.133 describes requirements for radio resource management, which are incorporated herein by reference in their entirety.

FIG. 1 illustrates the architecture of the radio access network that handles all radio-related functionality in Release '99. User Equipment (UE) 11 is connected via the radio interface to a respective first Node B 21-1. First Node B 21-1 converts the data flow between the Iub and radio interface and also participates to a limited extent in radio resource management. First Node B 21-1 and second Node B 21-2 are both connected to the same Radio Network Controller (RNC) 31-1 via the Iub interface and share the same radio resource management. RNC 31-1 is responsible for the control of the radio resources in its domain, i.e. first node B 21-1 and second node B 21-2. Although only two are shown in FIG. 1, there will normally be more than two Node B's connected to a single RNC. Each group of Node B's and single RNC constitute a radio network subsystem (RNS) and although only two are shown in FIG. 1, there will normally be a large number of RNS's in a radio access network. Collectively, the RNCs are the service access points for all services (including, for example, management of connections to UE 11) that the radio access network provides to a core network (not shown) via the Iu interface. The elements shown in FIG. 1 are defined at the logical level, but may have a similar physical implementation as well.

In Release '99, there is little flexibility in scheduling the transmissions on the uplink from UE 11 to Node B 21. The physical layer rate signaling terminates at Node B 21. The RRC limits the TFCS using various signaling formats and UE 11 can only use the allowed TFCS. This has the disadvantage that various measurements and UE RRC reports taken to SRNC, processed and sent to UE 11, all over a frame structure measured in milliseconds.

In Release '99, scheduling changes can be made in the uplink using the unacknowledged signaling mode in Radio Resource Control (RRC) with a specified activation time. Alternatively, the RRC includes the ability to control and limit the Transport Format Combination Control using various signaling formats. The transport format combination control can be sent in transparent mode on its own transport channel in every TTI. Transport format combinations can be indexed, with a list of allowed/non-allowed combinations or an full open set of combinations. For an example of the specifications, including the maximum of time that should pass after a signaling message is received due to processing in the UE before the new combination is assumed, see 3GPP TS 25.331 v 3.8.0, Section 13.5.

This method of using the RRC ability to limit the TFCS can be slow to adapt to changes in the network, such as in the amount of data to be transmitted between network elements. Also, since the method is dependent on RRC controlled by the RNC, it susceptible to processing bottlenecks and other factors affecting the performance of the RNC.

BRIEF SUMMARY

In a first aspect of the preferred embodiment of the invention, a wireless communications network comprises a plurality of terminals and at least one base station which transmits data to each one of said plurality of terminals on a wireless downlink and receives data from each one of said plurality of terminals on a wireless uplink. At least one of said plurality of terminals sends a rate request to said base station, said rate request requesting that the data rate on the wireless uplink be changed. Said base station, in response to said rate request from said at least one of said plurality of terminals, sends a rate grant to said at least one of said plurality of terminals, said rate grant indicating whether or not said at least one of said plurality of terminals may change the data rate on the wireless uplink.

In a second aspect of the preferred embodiments, the present invention provides a reliable data rate control method and wireless communications network including a radio access network which transmits data from a base station to a terminal in a wireless downlink and receives data from the terminal to the base station in a wireless uplink. In this aspect of the preferred embodiments of the invention, the terminal is adapted to receive two thresholds specifying the limits on the data rate on said wireless uplink, a first one of said two thresholds specifying a limit for said data rate that may be requested by said terminal and a second one of said two thresholds specifying a limit for said data rate that may be requested by said base station. The terminal sends a rate request on the wireless uplink from the terminal to the base station, said rate request requesting that the data rate on said wireless uplink be increased or decreased within the limits of said first one of said two thresholds. The terminal increases or decreases the data rate on said wireless uplink in accordance with said rate grant in response to a rate grant received from said base station, said rate grant indicating whether or not said data rate on said wireless uplink may be increased or decreased as requested in said rate request.

In another aspect of the preferred embodiments of the invention, the wireless communications network including a base station which transmits data to a terminal on a wireless downlink and receives data from a terminal on a wireless uplink carries out a method. The method comprises sending a rate request from said terminal to said base station, said rate request requesting that the data rate on the wireless uplink be increased or decreased; and in response to said rate request from said terminal, sending a rate grant to said terminal, said rate grant indicating whether or not said terminal may increase or decrease the data rate on the wireless uplink.

BRIEF DESCRIPTION OF THE DRAWINGS

The preferred embodiments are described below with reference to the accompanying drawings, in which.

Like reference numerals identify like parts throughout the drawings.

DETAILED DESCRIPTION OF THE PREFERRED EMBODIMENTS

The particulars shown herein are by way of example and for purposes of illustrative discussion of the preferred embodiments of the present invention. The description taken with the drawings make it apparent to those skilled in the art how other various embodiments of the present invention may be implemented in practice.

Figure 1:
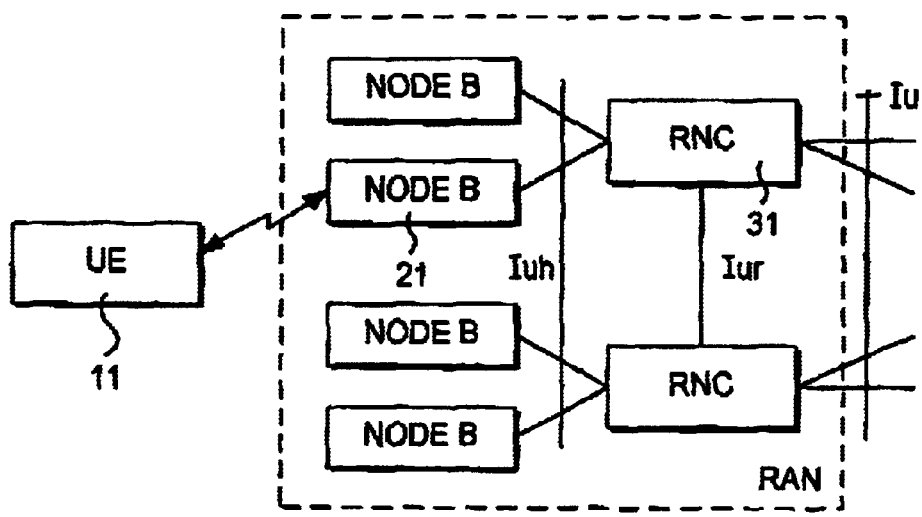
FIG. 1 is a block diagram illustrating the uplink connection of user equipment in a radio access network according to 3GPP Release '99.

Further, elements are shown in block diagram form in order to avoid obscuring the invention, and also in view of the fact that specifics with respect to implementation of such block diagram arrangements is highly dependent upon the network environment within which an embodiment of the present invention is to be implemented, i.e., specifics should be well within the purview of one skilled in the art. Although the preferred embodiments of the invention are described with reference to the example system block diagram of 3GPP Release '99 in FIG. 1, embodiments of the invention may be practiced in other wireless communication networks, including but not limited to, subsequent 3GPP specification releases.

Where specific details (e.g., interfaces) are set forth in order to describe embodiments of the invention, it should be apparent to one skilled in the art that the invention can be practiced without these specific details. Finally, it should be apparent that any combination of hardware and software programming can be used to implement embodiments of the invention and that the embodiments are not limited to any specific combination of hardware and software programming.

As known to one skilled in the art, data is conventionally transmitted over the air interface in accordance with radio resource control signaling sent by a RNC over Iub interface, which signaling includes configuration and reservation of radio resources. The Node B 21 performs L1 air interface processing such as channel coding and interleaving, rate adaptation, spreading, etc. The term "rate adaptation" refers to rate matching in which the number of data bits to be transmitted is adapted to the number of bits available on a frame and does not refer to the present invention. See, for example, Section 6.4.2 of the book "WCDMA for UMTS (revised edition)" by Harri Holma and Antti Toskala, published by John Wiley & Sons, 2001 for further discussion of rate matching. It also performs some basic radio resource management functions such as inner loop power control. The RNC 31 terminates the RRC signaling protocol with UE 11. It performs L2 air interface processing of the data to/from the radio interface. Radio Resource Management functions, such as mapping of Radio Access Bearer (RAB) parameters into air interface transport channel parameters, handovers, and outer loop power control are executed in RNC 31.

As described in further detail hereafter, the preferred embodiments of the invention have a two threshold rate control by which Node B 21, being closer to the air interface than SRNC 31, can perform limited but fast uplink scheduling operations. The two thresholds for two respective network elements allow fast and distributed scheduling of data on the uplink. The preferred embodiments of the invention are not limited to any particular signaling method for performing the scheduling over the air interface. An example of the uplink signaling method is provided in U.S. patent application Ser. No. 10/156,751, filed on May 24, 2002, entitled "Method and Apparatus for Distributed Signaling for Uplink Rate Control" and commonly assigned to Nokia Corporation, the assignee of this application, the contents of such application are hereby incorporated by reference in their entirety.

As a preferred embodiment of this invention, the two thresholds are set with reference to the combination sets utilized in the Transport Format Combination Control (TFCC). In 3GPP Release '99, transport format combination control is specified in 3GPP TS 25.331 v3.8.0 (2001-09), Section 8.2.5 and data rates correspond to various transport format combination sets. Specifically, in the preferred embodiments, RNC 31 specifies two transport format combination set (TFCS) thresholds. In addition to UE threshold 100, a Node B threshold 200 is also specified. Both Node B 21 and UE 11 are informed of these thresholds. UE 11 is normally limited to UE threshold 100, but may use the Node B threshold 200 as instructed by Node B 21. There is no per se limitation on the value of UE threshold 100 and Node B threshold 200. Indeed, either Node B threshold 200 or both thresholds may include the entire TFCS range.

Figure 2:
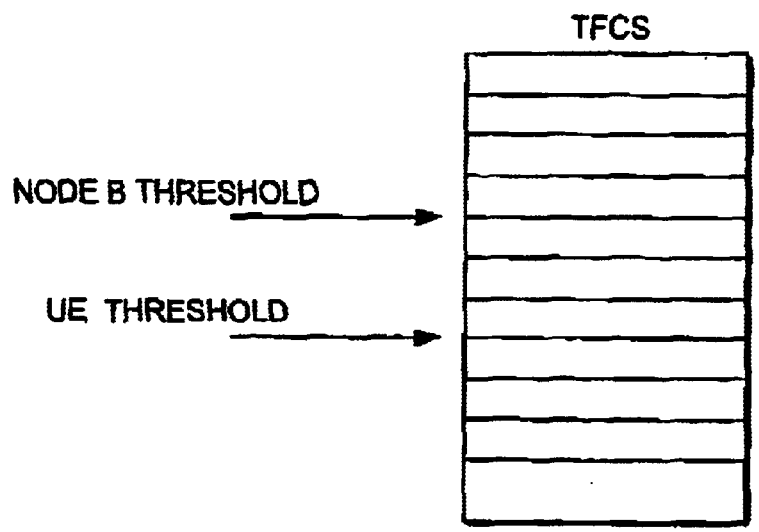
FIG. 2 graphically illustrates an example of the two RRC controlled thresholds applied to the transport format combination set according to the preferred embodiments of the invention.

FIG. 2 graphically depicts the TFCS thresholds. Separate RRC signaling between Node B 21 and UE 11 controls TFCS selection and utilization of the space above UE threshold 100 and below Node B threshold 200. UE 11 can freely select its Transport Format Combination (TFC) from any of those in the set below the UE threshold 100. Between the UE threshold 100 and Node B threshold 200, Node B 21 can control the limitations given to UE 11. Hence, Node B 21 can selectively schedule the uplink data rates of UE 11.

UE 11 is aware of the entire range of possible data rates (TFCS) for the wireless uplink, such as, for example, from 16 kbps to 2 Mbps. The UE threshold 100 specifies the highest data rate that it can use (with appropriate signaling from RNC), such as, for example, 384 kbps. The Node B threshold 200 can be set at, for example, 2 MBps, and UE 11 can be required to send a rate request to Node B 21 for changes in the data rate above 384 kbps. This requirement may be made for all such changes (increase or decrease) or only for increases in the data rate. Node B 21 and UE 11 may receive only UE threshold 100 or both UE threshold 100 and Node B threshold 200. In particular, Node B 21 may receive both thresholds, but UE 11 receives only UE threshold 100.

Figure 3:
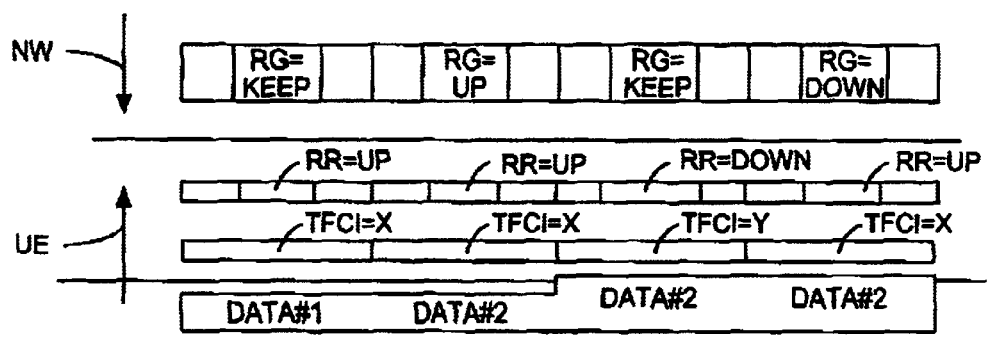
FIG. 3 graphically illustrates a data rate control concept utilized in the preferred embodiments of the invention.

FIG. 3 depicts the data rate control concept utilized in the preferred embodiments of the invention. The bottom portion of FIG. 3 indicates the value of rate requests sent by UE 11, the value of the transport format combination as indicated by the TFCI value, and the data on the wireless uplink. The upper portion of FIG. 3 indicates the value of the rate grant signal sent by Node B in response to the rate request.

The sequence of events in the preferred method is as follows. First, UE 11 transmits its data along with a rate request (up or down). Node B 21 receives the data and the rate request (RR) from UE 11. Then, Node B 21 sends a rate grant to UE 11 containing an indication of whether the UE 11 may increase, decrease or remain at the current data rate depending on the received interference conditions or other appropriate traffic metrics either derived/measured at Node B 21 and/or sent to Node B 21 from RRC. In one embodiment, UE 11 may be considered to have returned to the range of allowed data rates if it is using data rates below that specifed by UE threshold 100 (384 kbps in the above example). In such a case, a rate request to decrease the data rate on the wireless uplink would not ever be necessary.

Preferably, but not necessarily, the up/down rate request is included at every TTI period. Preferably, but not necessarily, the up/down/keep rate grant is provided at every TTI period. Alternatively, the rate request may be sent when a certain event occurs in UE 11, such as, for example, when the transmit buffer of UE 11 exceeds a certain limit.

Figure 4:
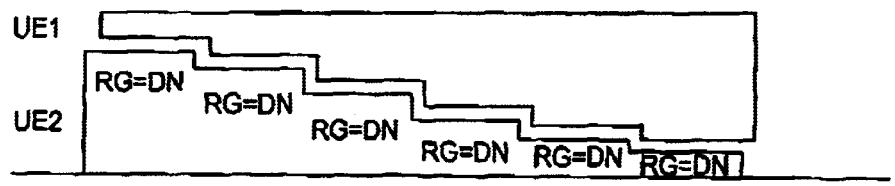
FIG. 4 graphically illustrates an example of multiple user equipment rate control according to a preferred embodiment of the present invention.

FIG. 4 demonstrates a scenario whereby multiple UEs using the two threshold concept are controlled by Node B 21. In this example, Node B 21 controls the first UE's data rate (increasing) and the second UE's data rate (decreasing) at regular intervals. In particular, it slowly redistributes resources between each UE primarily connected to it under control of RNC 31. The changes are gradual as allowed by RRM. A primary connection is established so that only one Node B in a network can control one UE.

These preferred embodiments of the invention provide termination closer to air interface than in conventional radio access network architectures. They also provide the advantage of faster processing on L1/L2 between Node B 21 and UE 11. This is because even though the time intervals are subject on any particular network implementation, the time intervals of communication frames between UE 11 and Node B 21 are typically measured in the tens of milliseconds. Thus the speed with which the data scheduling on the uplink can be adjusted in the space between UE threshold 100 and Node B threshold 200 is several orders of magnitude grater than that which can be achieved when the adjustments are dependent on the signaling from RNC 31.

Signaling of the two thresholds to UE 11 is a trivial addition to the RRC protocol and the details thereof are not essential to the invention. One embodiment would be to add the Node B threshold 200 as an optional extra parameter or information element to the Transport Format Combination Control (TFCC) message in RRC signaling.

Likewise, signaling of the UE threshold 100 and Node B threshold 200 to to Node B 21 would be an extension of the Node B Application Protocol (NBAP) where the details are not essential. Of course, the notification of the two threshold to Node B 21 can be carried out in any number of different ways.

While the invention has been described in terms of its preferred embodiments, it should be understood that numerous modifications may be made thereto. It is intended that all such modifications fall within the scope of the appended claims.

What is claimed is:

1. In a wireless communications system including a radio access network which transmits data from a base station to a terminal in a wireless downlink and receives data from the terminal to the base station in a wireless uplink, a terminal which is adapted to:

receive a first threshold specifying the upper limit on the data rate on said wireless uplink that said terminal may use without a separate rate grant from said base station; send a rate request on the wireless uplink from the terminal to the base station, said rate request requesting that the data rate on said wireless uplink be changed within the limits of a second threshold; and in response to a rate grant received from said base station, said rate grant indicating whether or not said data rate on said wireless uplink may be changed as requested in said rate request, change the data rate on said wireless uplink in accordance with said rate grant.

2. A terminal in accordance with claim 1, wherein said terminal sends the rate request along with data in the wireless uplink.

3. A terminal in accordance with claim 1, wherein said terminal receives said rate grant from said base station in said wireless downlink.

4. A terminal in accordance with claim 1, wherein said terminal sends said rate request periodically.

5. A terminal in accordance with claim 4, wherein said terminal sends said rate request at every TTI.

6. A terminal in accordance with claim 1, wherein said terminal sends said rate request upon the occurrence of an event in said terminal.

7. A terminal in accordance with claim 6, wherein said terminal sends said rate request when the transmission buffer of said terminal exceeds a specified limit.

8. A terminal in accordance with claim 1, wherein said rate request requests that the data rate on said wireless uplink be increased and, in response to a rate grant received from said base station, said rate grant indicating that said data rate on said wireless uplink may be increased as requested in said rate request, increases said data rate on said wireless uplink in accordance with said rate grant.

9. A terminal in accordance with claim 8, wherein said terminal may decrease the data rate on said wireless uplink, from a data rate greater than said upper limit on the data rate on said wireless uplink specified by said first threshold, without a separate rate grant from said base station.

10. A terminal in accordance with claim 1, wherein said terminal receives a parameter or other information in RRC signaling from said base station, said parameter or other information indicating said first threshold.

11. A terminal in accordance with claim 1, wherein the air interface between the terminal and the base station is wide band code division multiple access (WCDMA).

12. A wireless communications network comprising:

a plurality of terminals; and at least one base station which transmits data to each one of said plurality of terminals on a wireless downlink and receives data from each one of said plurality of terminals on a wireless uplink at a data rate that is less than a first threshold without a separate rate ant from said at least one base station;

wherein at least one of said plurality of terminals sends a rate request to said base station, said rate request requesting that the data rate on the wireless uplink be changed within the limits of a second threshold; and said base station, in response to said rate request from said at least one of said plurality of terminals, sends a rate grant to said at least one of said plurality of terminals, said rate grant indicating whether or not said at least one of said plurality of terminals may change the data rate on the wireless uplink.

13. A wireless communications network in accordance with claim 12, wherein said at least one of said plurality of terminals send the rate request along with data in the wireless uplink.

14. A wireless communications network in accordance with claim 12, wherein said base station sends said rate grant in said wireless downlink.

15. A winless communications network in accordance with claim 12, wherein said rate grant sent by said base station depends on interference conditions received at the base station.

16. A wireless communications network in accordance with claim 12, wherein said rate grant sent by said base station depends on traffic metrics derived and/or measured at the base station.

17. A wireless communications network in accordance with claim 12, wherein said network further comprises a base station controller and said rate grant sent by said base station depends on traffic metrics sent to said base station from said base station controller.

18. A winless communications network in accordance with claim 12, wherein said rate request requests that the data rate on said wireless uplink be increased and, in response to a rate grant received from said base station, said rate grant indicating that said data rate on said wireless uplink may be increased as requested in said rate request, increases said data rate on said wireless uplink in accordance with said rate grant.

19. A wireless communication network in accordance with claim 18, wherein said terminal may decrease the data rate on said wireless uplink without a separate rate grant from said base station.

20. A wireless communications network in accordance with claim 12, wherein the air interface between the terminal and the base station is wide band code division multiple access (WCDMA).

21. A wireless communication network in accordance with claim 12, wherein said at least one of the plurality of terminals is provided with said first and second Thresholds limiting the data rate on the uplink and the rate requests sent by said terminal are limited to the second threshold.

22. A wireless communication network in accordance with claim 21, wherein each one of said plurality of terminals is provided with said first and second thresholds limiting the data rate on the uplink and said base station controls the data rate on the uplink from each one of said plurality of terminals in response to a rate request from any one of said plurality of terminals.

23. In a wireless communications network including a base station which transmits data to a terminal on a wireless downlink and receives data from a terminal on a wireless uplink, a method comprising:

sending a rate request from said terminal to said base station, said rate request requesting that the data rate on the wireless uplink be changed from a data rate that is less than a first threshold applicable without a separate rate grant from said base station, to a data rate within the limits of a second threshold; and in response to said rate request from said terminal, sending a rate grant to said terminal, said rate grant indicating whether or not said terminal may change the data rate on the wireless uplink.

24. A method in accordance with claim 23, wherein said terminal sends the rate request along with data in the wireless uplink.

25. A method in accordance with claim 23, wherein said base station sends said rate grant in said wireless downlink.

26. A method in accordance with claim 23, wherein said rate grant sent by said base station depends on interference conditions received at the base station.

27. A method in accordance with claim 23, wherein said rate grant sent by said base station depends on traffic metrics derived and/or measured at the base station.

28. A method in accordance with claim 23, wherein said rate grant sent by said base station depends on traffic metrics sent to said base station from said base station controller.

29. A method in accordance with claim 23, wherein the air interface between the terminal and the base station is wide band code division multiple access (WCDMA).

30. A method in accordance with claim 23, wherein said terminal is provided with said first and second thresholds limiting the data rare on the wireless uplink and the rate requests sent by said terminal are limited to the second threshold.

31. A method in accordance with claim 23, wherein said rate request requests that the data rate on said wireless uplink be increased and, in response to a rate grant received from said base station, said rate grant indicating that said data rate on said wireless uplink may be increased as requested in said rate request, increases said data rate on said wireless uplink in accordance with said rate grant.

32. A method in accordance with claim 31, wherein said terminal may decrease the data rate on said wireless uplink without a separate rate grant from said base station.

33. In a wireless communications network, a base station adapted to:

transmit data to a terminal on a wireless downlink;

receive data from said terminal on a wireless uplink;

receive a rate request from said terminal, said rate request requesting that the data rate on the wireless uplink be changed from a data rate that is less than a first threshold applicable without a separate rate grant from said base station, to a data rate within the limits of a second threshold; and in response to said rate request from said terminal, send a rate grant to said terminal, said rate grant indicating whether or not said terminal may change the data rate on the wireless uplink.

34. A base station in accordance with claim 33, wherein said base station receives the rate request along with data in the wireless uplink.

35. A base station in accordance with claim 33, wherein said base station sends said rate grant in said wireless downlink.

36. A base station in accordance with claim 33, wherein said rate grant sent by said base station depends on interference conditions received at the base station.

37. A base station in accordance with claim 33, wherein said rate grant sent by said base station depends on traffic metrics derived and/or measured at the base station.

38. A base station in accordance with claim 33, wherein said rate grant sent by said base station depends on traffic metrics sent to said base station from said base station controller.

39. A base station in accordance with claim 33, wherein the air interface between the terminal and the base station is wide band code division multiple access (WCDMA).

40. A base station in accordance with claim 33, wherein said base station is provided with said first and second thresholds limiting the data rate on the wireless uplink and the rate requests sent by said terminal are limited to the second threshold.

41. A base station in accordance with claim 33, wherein said rate request requests that the data rate on said wireless uplink be increased and, in response to a rate grant received from said base station, said rate grant indicating that said data rate on said wireless uplink may be increased as requested in said rate request, increases said data rate on said wireless uplink in accordance with said rate grant.

* * * * *